United States Patent
Yun et al.

(10) Patent No.: US 7,952,973 B2
(45) Date of Patent: May 31, 2011

(54) METHOD OF CONTROLLING RECORDING OF OPTICAL DISC DEVICE AND OPTICAL DISC DEVICE USING THE METHOD

(75) Inventors: Seok-Min Yun, Suwon-si (KR); Soo-Yong Kim, Pohang-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 390 days.

(21) Appl. No.: 12/171,031

(22) Filed: Jul. 10, 2008

(65) Prior Publication Data

US 2009/0059756 A1    Mar. 5, 2009

(30) Foreign Application Priority Data

Sep. 5, 2007 (KR) .................. 10-2007-0089950

(51) Int. Cl.
*G11B 7/00* (2006.01)
(52) U.S. Cl. .................. 369/53.36; 369/53.2; 369/53.16; 369/47.31
(58) Field of Classification Search .................. None
See application file for complete search history.

(56) References Cited

U.S. PATENT DOCUMENTS 7,177,248 B2 * 2/2007 Kim et al. .................. 369/47.11
7,675,535 B2 * 3/2010 Honda et al. .................. 347/224

FOREIGN PATENT DOCUMENTS

| JP | 2000-149268 | 5/2000 |
| JP | 2006-107634 | 4/2006 |
| KR | 1020020088677 | 11/2002 |
| KR | 1020050087019 | 8/2005 |

* cited by examiner

*Primary Examiner* — Muhammad N Edun
(74) *Attorney, Agent, or Firm* — F. Chau & Associates, LLC

(57) ABSTRACT

A method of controlling recording of an optical disc device and an optical disc device using the method. The optical disc device performs recording of data on a labeled surface of the optical disc. The device includes a buffer memory, a record unit and a controller. The buffer memory stores data and the record unit records data on the labeled surface of the optical disc from the buffer memory. The controller controls the record unit such that when a recording error occurs, the recording is stopped and when the error is corrected, data is recorded from a stopped position.

16 Claims, 6 Drawing Sheets

METHOD OF CONTROLLING RECORDING OF OPTICAL DISC DEVICE AND OPTICAL DISC DEVICE USING THE METHOD

CROSS-REFERENCE TO RELATED APPLICATION

This application claims the benefit of Korean Patent Application No. 10-2007-0089950, filed on Sep. 5, 2007, in the Korean Intellectual Property Office, the disclosure of which is incorporated herein in its entirety by reference.

BACKGROUND OF THE INVENTION

1. Technical Field

The present general inventive concept relates to an optical disc device, and more particularly, to a method of controlling recording of an optical disc device and an optical disc device using the method.

2. Discussion of the Related Art

Conventional optical disc devices, such as compact disc players, laserdisc players and video compact disc players, reproduce images and/or sounds recorded on an optical disc to output the reproduced images and/or sounds through a display and/or speaker.

These optical disc devices use light in order to read or write data. To correctly record data on or read data from an optical disc, light may be precisely focused on a signal surface of the optical disc. In recent years, a technique of writing data to a labeled surface of the optical disc has come to light. In this technique, a general optical disc device writes data on the labeled surface using a laser diode. Writing data to the labeled surface of the optical disc is generally performed without error. However, if an error occurs when writing the data, for example, when light is not precisely focused on the labeled surface of the optical disc, data writing may continue on without correcting for the error. Thus, in case where an error is generated during recording, abnormal data occurs at a corresponding portion of the optical disc. As a result, the desired data may not be completely formed on the labeled surface of the optical disc.

SUMMARY OF THE INVENTION

The present general inventive concept provides an optical disc device that can stop recording when a recording error occurs in performing the recording on a labeled surface of an optical disc, and again start recording from a stopped position when an error has been corrected.

The present general inventive concept also provides a method of controlling recording of the optical disc device.

According to an aspect of the present invention, there is provided an optical disc device, which performs recording of data, such as optical disc image data, on a labeled surface of an optical disc, the optical disc device includes a buffer memory storing data, a record unit using data stored in the buffer memory to record the data to the labeled surface of the optical disc, and a controller controlling the record unit such that when a recording error occurs, the recording is stopped and when an error has been corrected, corresponding data is recorded from a stopped position.

The optical disc device may further include a memory storing an initial recording position where the record unit starts an initial recording, and storing a stopped position where the recording is stopped.

The controller may control the record unit such that from the point of time when the record unit again starts the recording, in the case where it is intended to again record the data of the buffer memory corresponding to the initial recording position, the record unit prepares to record a next track.

The controller may control the record unit to stop the recording when a recording error occurs due to the recording not being performed on the optical disc, the optical disc device undergoing an impact or vibration, or a recording voltage being unstable.

The optical disc device may further include an error detecting unit outputting an error signal having different logic states according to whether the recording has an error.

The error detecting unit may output an error signal of a first logic state when the recording has an error, and an error signal of a second logic state when the recording has no error.

The controller may control the record unit such that when the error signal has the first logic state, the recording is stopped, and when the logic state of the error signal changes from the first logic state to the second logic state, corresponding data is recorded from the stopped position.

The controller may delete data already recorded from the buffer memory when the recording error occurs during the recording.

According to an aspect of the present invention, there is provided an optical disc device, which performs recording on a labeled surface of an optical disc, the optical disc device includes a buffer memory storing data, a record unit using data stored in the buffer memory to record an image on the labeled surface of the optical disc, and a controller controlling the record unit such that when a Focus OK (FOK) signal has a first logic state, the recording is stopped, and when the logic state of the FOK signal changes from the first logic state to a second logic state, corresponding data is recorded from a stopped position. The FOK signal has the first logic state when the recording has an error and has the second logic state when the recording has no error.

The optical disc device may further include a memory storing an initial recording position where the record unit starts an initial recording, and storing a stopped position where the recording is stopped.

The FOK signal may have the first logical state when a recording error is caused by the recording not being performed on the optical disc. Recording may not be performed when the optical disc device undergoes an impact or vibration, a spindle motor being stopped, or a recording voltage being unstable. According to an aspect of the present invention, there is provided a method of controlling recording of an optical disc device performing recording on a labeled surface of an optical disc. The method includes stopping the recording when a recording error occurs and recording corresponding data from a stopped position of the recording when the recording error is removed.

The method may further include storing an initial recording position where an initial recording starts, and a stopped position where the recording is stopped.

According to an aspect of the present invention, there is provided a method of controlling recording of an optical disc device performing recording on a labeled surface of an optical disc. The method includes stopping the recording when an error signal has a first logic state and recording corresponding data from a stopped position of the recording when the logic state of the error signal changes from the first logic state to a second logic state. The error signal has the first logic state when the recording has an error and the second state when the recording has no error.

The method may further include storing an initial recording position where an initial recording starts, and a stopped position where the recording is stopped.

BRIEF DESCRIPTION OF THE DRAWINGS

The above and other features and aspects of the present general inventive concept will become more apparent by describing in detail exemplary embodiments thereof with reference to the attached drawings in which.

DETAILED DESCRIPTION OF THE EXEMPLARY EMBODIMENTS

Figure 1:
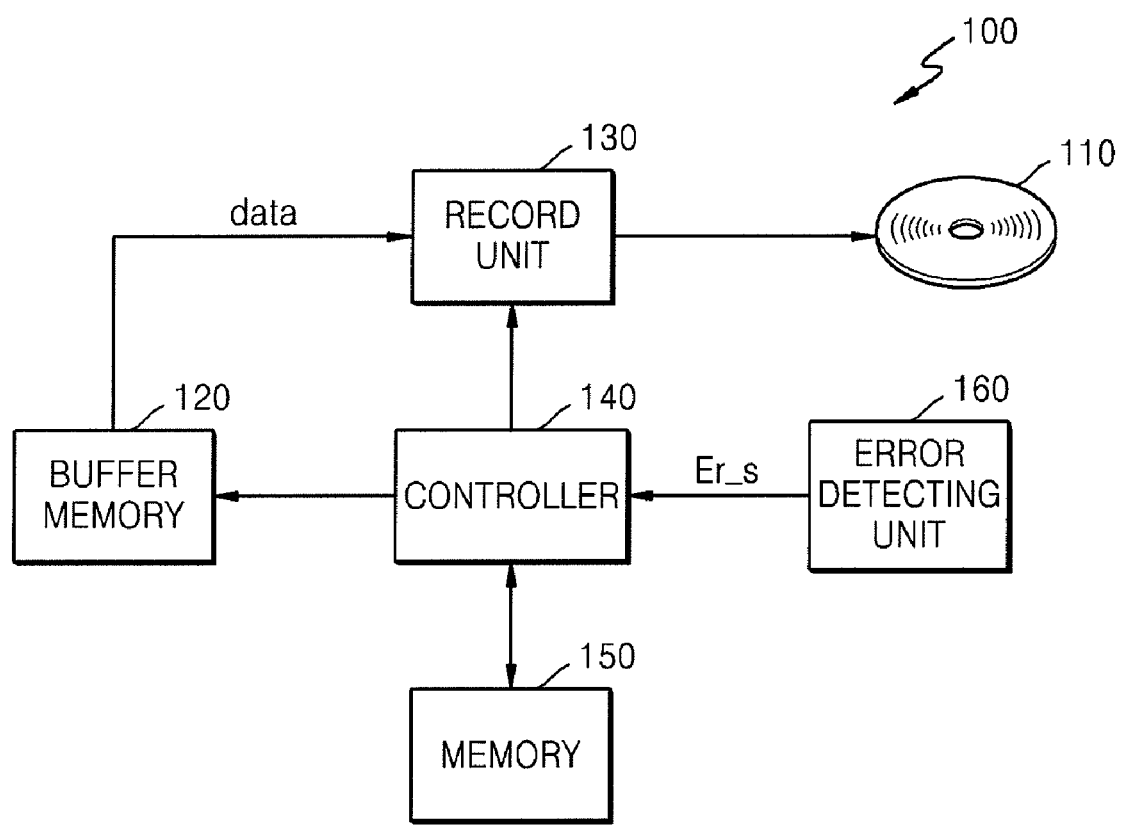
FIG. 1 is a block diagram of an optical disc device according to an exemplary embodiment of the present general inventive concept.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner. Like reference numerals in the drawings may denote like elements.

FIG. 1 is a block diagram of an optical disc device 100 according to an exemplary embodiment of the present general inventive concept.

Referring to FIG. 1, the optical disc device 100 may include an optical disc 110, a buffer memory 120, a record unit 130 and a controller 140.

The optical disc 110 may have at least one circular track. Alternatively, the optical disc 110 may have at least one spiral track. The present general inventive concept can be applied to a case where the optical disc 110 has a spiral track as well as a case where the optical disc 110 has a circular track.

The buffer memory 120 stores data of an image to be recorded on a labeled surface of the optical disc 110. Data may be recorded to an optical disc using a disc image. The disc image is an arrangement of data to be written to the optical disc conforming to the format of that particular optical disc. The record unit 130 writes the disc image to the labeled surface of the optical disc 110 using data stored in the buffer memory 120. Hereinafter the process of writing a disc image on the optical disc 110 will be referred to as "recording data".

The controller 140 controls the record unit 130 according to whether a recording error occurs while the record unit 130 performs recording. For example, when a recording error occurs, the controller 140 controls the record unit 130 to stop the recording. Hereinafter, the occurrence of recording error indicates a case where a recording is not performed on the optical disc 110 due to a focus loss, focus drop or the like, a case where the optical disc 110 undergoes an impact or vibration, a case where a spindle motor (not shown) is stopped, and/or a case where a recording voltage is unstable. However, it will be apparent to those skilled in the art that the occurrence of recording error represents all cases where recording is not normally performed and is not limited only to the aforementioned cases.

When a recording error occurs, the controller 140 controls the record unit 130 to stop the recording. After an error has been corrected, the controller 140 controls the record unit 130 to record corresponding data from the stopped position of the optical disc 110. For example, the record unit 130 records data starting from the data corresponding to the stopped position from data stored in the buffer memory 120.

The optical disc device 100 may further include a memory 150 for storing an initial recording position where the record unit 130 starts recording initially and a recording stop position where recording is stopped. For example, the controller 140 can control the record unit 130 to perform recording using the initial recording position and the recording stop position stored in the memory 150.

A method of controlling operation of the record unit 130 at the controller 140 will be described in more detail with reference to FIGS. 4A and 4B.

FIG. 1 shows an exemplary embodiment in which the controller 140 determines whether a recording error occurs using an error detecting unit 160. The error detecting unit 160 outputs an error signal Er_s having a different logic state according to whether the recording has an error. For example, the error detecting unit 160 outputs an error signal Er_s in a first logic state when the recording has an error, and outputs an error signal Er_s in a second logic state when the recording has no error. Hereinafter, the first logic state indicates logic high state and the second logic state indicates logic low state. However, it is only desired that the error signal Er_s have different logic states according to whether the recording has an error. Contrary to the above case, it will be understood by those skilled in the art that the same effect can be obtained if an error signal Er_s in logic low state is outputted when the recording has an error and an error signal Er_s in logic high state is outputted when the recording has no error.

The controller 140 can determine whether or not the recording has an error from the logic state of the error signal Er_s. For instance, when the error signal Er_s has a first logic state, the controller 140 controls the record unit 130 to stop the recording. Additionally, when the logic state of the error signal Er_s changes from the first logic state to a second logic state, the controller 140 can control the record unit 130 to record corresponding data from the stopped position.

An exemplary embodiment in which the optical disc device 100 determines whether or not the recording has an error using a Focus OK (FOK) signal instead of using the error detecting unit 160 will be described with reference to FIG. 2.

Figure 2:
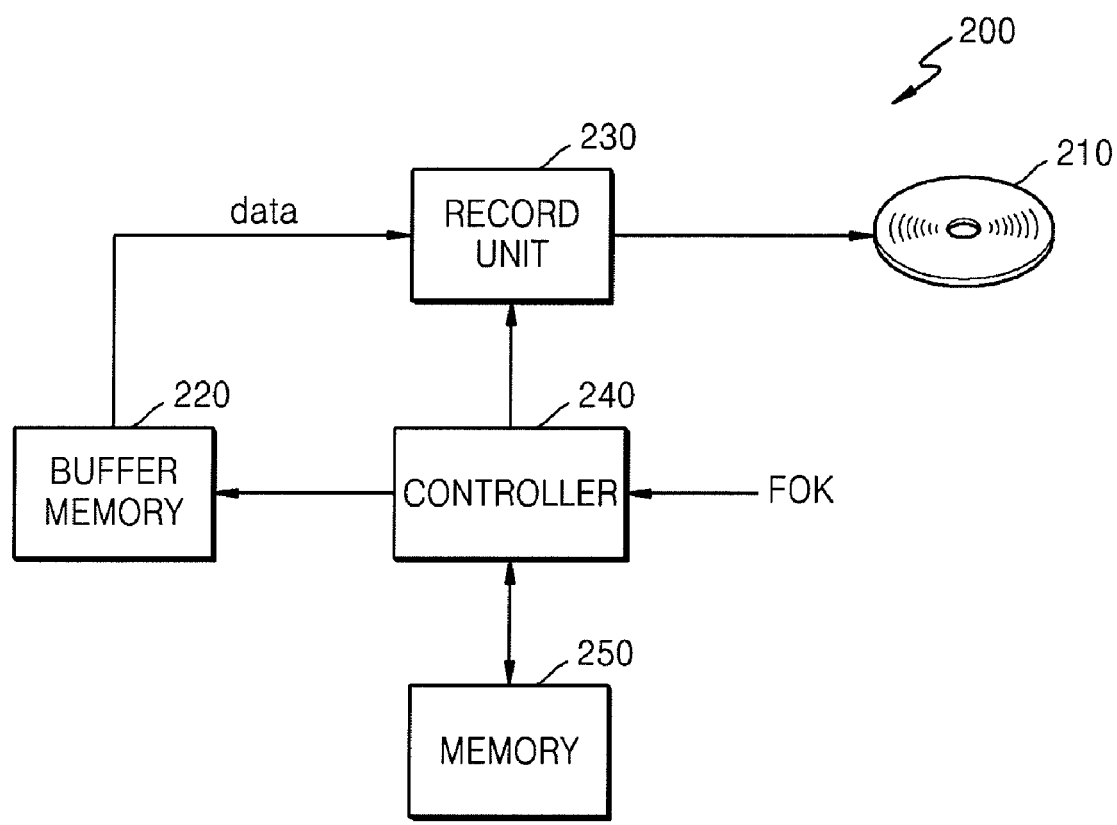
FIG. 2 is a block diagram of an optical disc device according to an exemplary embodiment of the present general inventive concept.

FIG. 2 is a block diagram illustrating an optical disc device 200 according to an exemplary embodiment of the present general inventive concept.

An optical disc 210, a buffer memory 220, a record unit 230 and a memory of the optical disc device 200 of FIG. 2 perform similar operation to the optical disc 110, the buffer memory 120, the record unit 130 and the memory 150 of the optical disc device of FIG. 1. The FOK signal is a signal having different logic states according to whether the recording has an error. The FOK signal has a first logic state when the recording has an error, while the FOK signal has a second logic state when the recording has no error. As in the aforementioned error signal Er_s, it is desired that the FOK signal should have different logic states according to whether the recording has an error. Contrary to the above case, it will be understood by those skilled in the art that the same effect can be obtained if an FOK signal in logic low state is outputted when the recording has an error and an FOK signal in logic high state is outputted when the recording has no error.

The controller 240 can determine whether or not the recording has an error from logic states of the FOK signal. For instance, when the FOK signal has a first logic state, the controller 240 controls the record unit 230 to stop the recording. Additionally, when the logic state of the FOK signal changes from the first logic state to a second logic state, the controller 240 can control the record unit 230 to record corresponding data from the stopped position.

Figure 3:
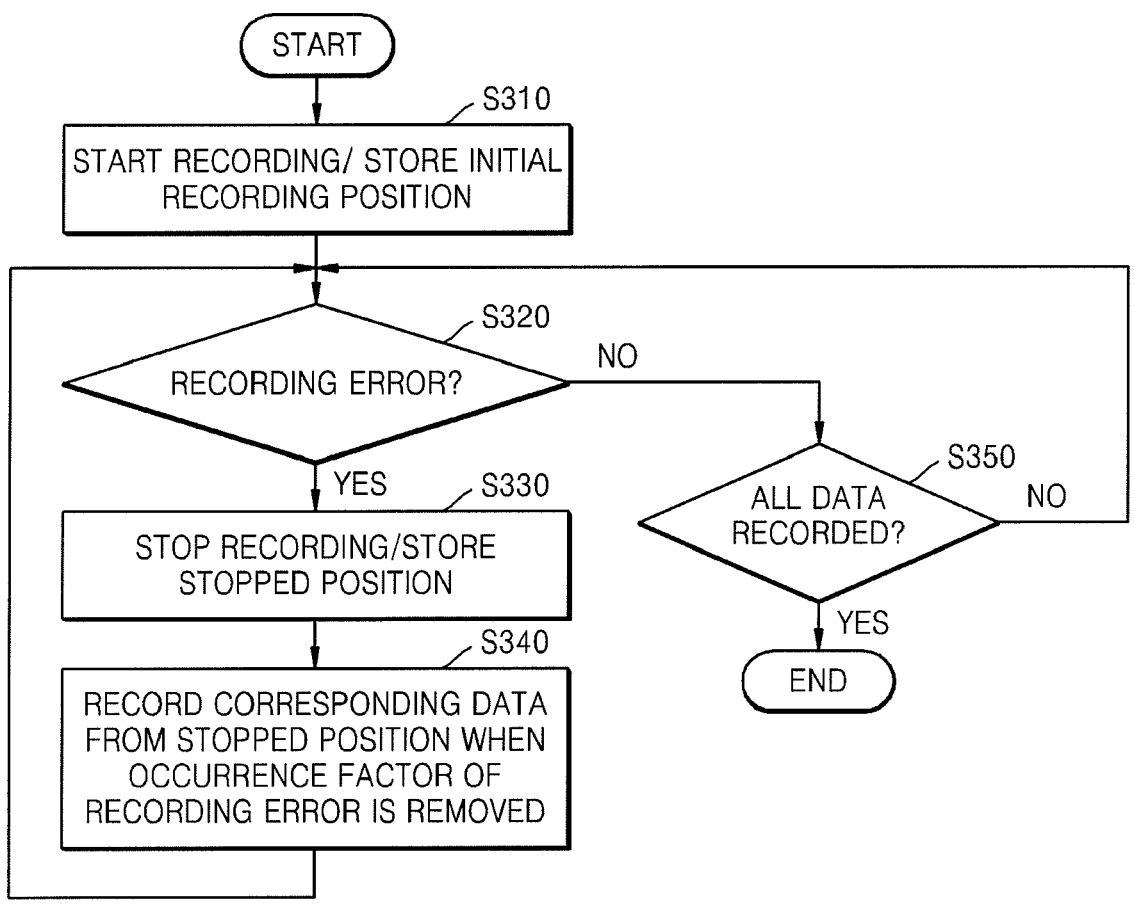
FIG. 3 is a flowchart illustrating a method of controlling recording of an optical disc device according to an exemplary embodiment of the present general inventive concept.

FIG. 3 is a flowchart illustrating a method of controlling recording of an optical disc device according to an exemplary embodiment of the present general inventive concept.

Figure 4A:
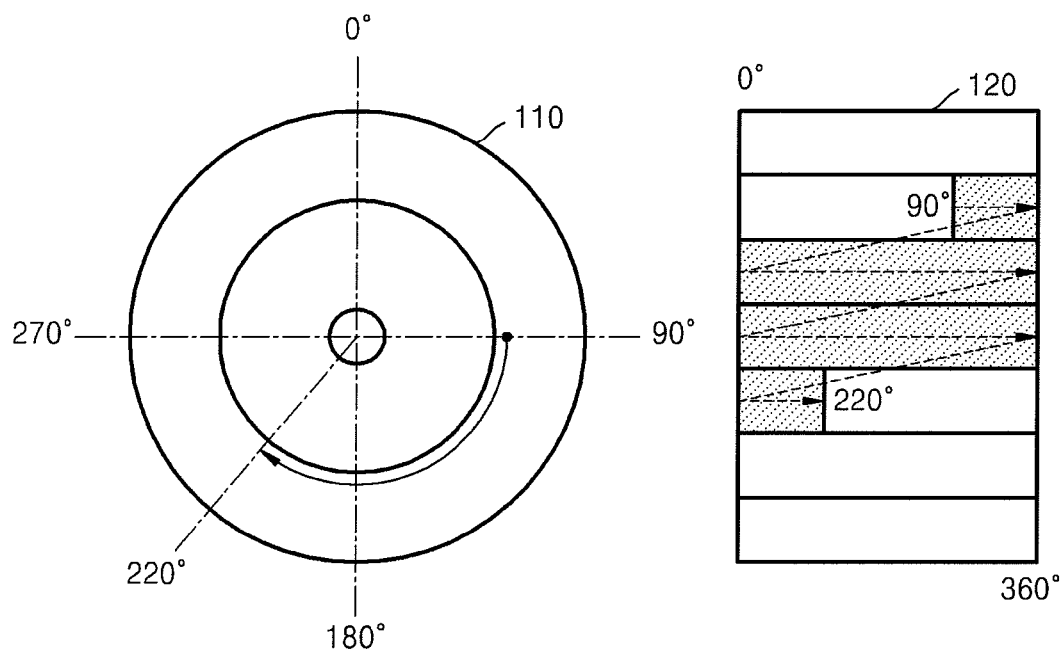
FIG. 4A is a schematic view for illustrating recording before a recording error occurs in an optical disc device according to an exemplary embodiment of the present general inventive concept.

FIG. 4A is a schematic view illustrating recording before a recording error occurs in an optical disc device according to an exemplary embodiment of the present general inventive concept.

Figure 4B:
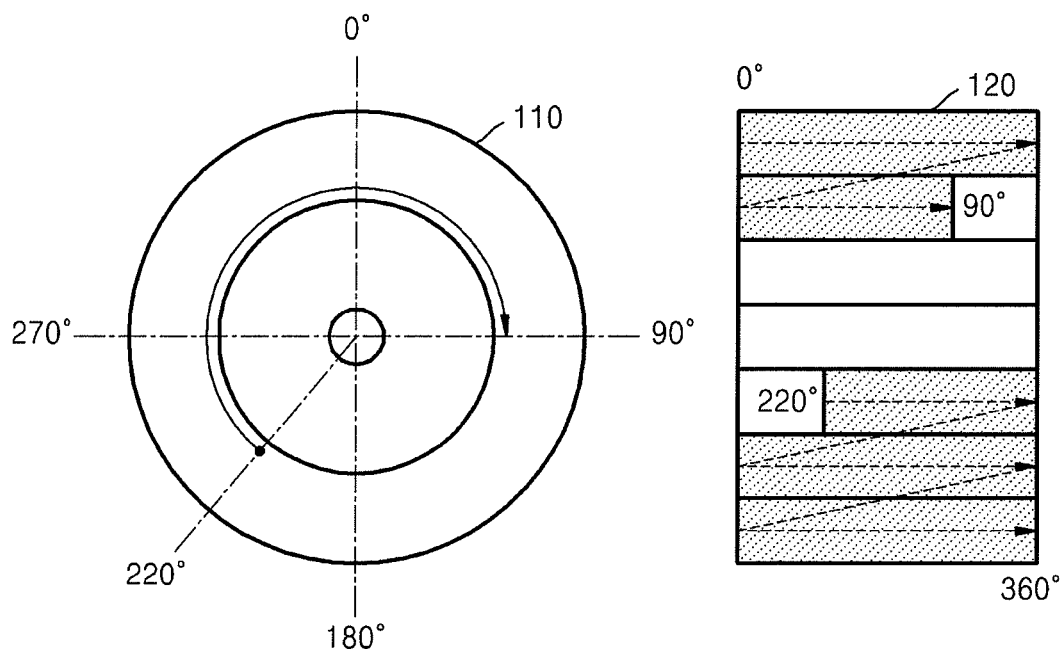
FIG. 4B is a schematic view for illustrating recording after a recording error occurs and the error is corrected.

FIG. 4B is a schematic view illustrating recording after a recording error occurs and an the recording error has been corrected.

A method of controlling recording of the optical disc device 100 will now be described with reference to FIG. 1 and FIG. 3 to FIG. 4B. Hereinafter, recording is described as occurring on a circular track of the labeled surface of the optical disc 110. However, it will be understood to those skilled in the art that recording may also be performed on a spiral track of the labeled surface of the optical disc 10 by using the same method as the present general inventive concept to obtain the same effect.

FIG. 4A illustrates that recording is performed at a position of 90° of a track of the optical disc 10. However, it will be apparent to those skilled in the art that using a different start point will yield the same effect because recording of an image and/or data can be performed over one cycle, to begin and end at a start point of a track. In step S3 10, while the record unit 130 performs recording, an initial recording position corresponding to a position of 90° of the track is stored in the memory 150. In step S320, while the record unit 130 performs recording, it is determined whether or not the recording has an error. An exemplary embodiment, in which it is determined whether or not the recording has an error using an error signal Er_s, will be described with reference to FIG. 5. It will be apparent to those skilled in the art that the same effect can be obtained regardless of the method used to determine whether or not the recording has an error.

The record unit 130 records data starting from data of the buffer memory 120 (which is data of a position marked at 90° of the buffer memory 120 of FIG. 4A) corresponding to the initial recording position. It is assumed that while the record unit 130 is performing the recording, a recording error occurs at a 220° position of the track. Since the recording error occurs (Yes, Step S320), the controller 140 controls the record unit 130 to stop the recording, and a stopped position corresponding to the 220° position of the track is stored in the memory 150 (step S330). Accordingly, the record unit 130 does not perform recording from when the recording error occurs to when the error is corrected. In this case, the controller 140 can delete the data recorded until that point from data stored in the buffer memory 120. For example, the controller 140 can change all the data from a 90° position up to a 220° position of the buffer memory 120 of FIG. 4A to all have a value of "0."

After the error is corrected, for example, in the case where a vibration is generated from the optical disc device 100 to such a degree that the recording cannot be performed and is then stopped, the controller 140 controls the record unit 130 so that corresponding data can be recorded from the stopped position in step S340. For example, the controller 140 receives information that the stopped position is a 220° position of the track from the memory 150. Also, the controller 140 controls the record unit 130 to record the data (which is the data corresponding to the 220° position of the buffer memory 120 of FIG. 4B) of the buffer memory 120 corresponding to the stopped position from the stopped position (which is the 220° position of the track).

In step S320, while the recording is normally performed, it is determined whether a recording error occurs. Whenever a recording error occurs, the steps of S330 and S340 are repeatedly performed.

In step S350, in the case where an error does not occur in the recording (No, Step S320) and all the data of the buffer memory 120 is recorded in the track, the record unit 130 ends the recording for the track and prepares recording for a next track. For example, when the record unit 130 again starts recording from the 220° position of the track, in the case where all recording for the track is performed normally and data at the 90° position of the track is recorded, the record unit 130 ends the recording for the track and prepares to record a next track.

Figure 5:
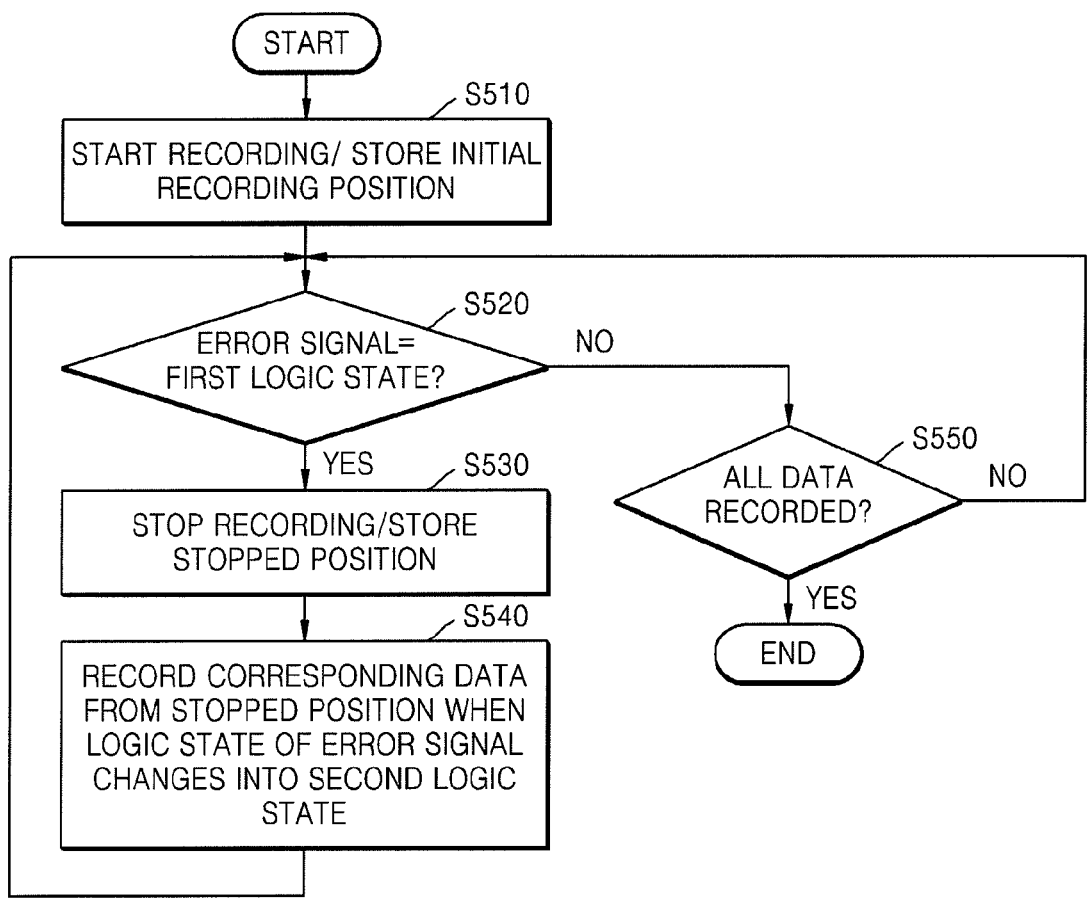
FIG. 5 is a flowchart for illustrating a method of controlling recording of an optical disc device according to an exemplary embodiment of the present general inventive concept.

FIG. 5 is a flowchart illustrating a method of controlling recording of an optical disc device according to an exemplary embodiment of the present general inventive concept.

Figure 6:
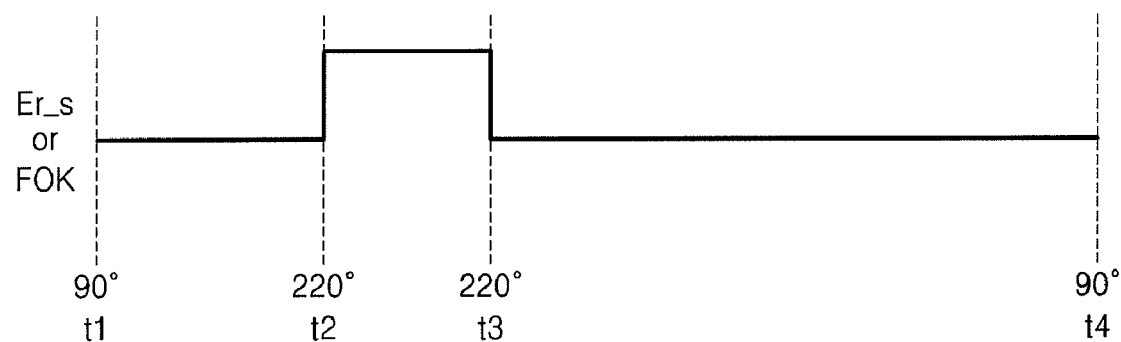
FIG. 6 is a waveform of an error signal or Focus OK (FOK) signal.

FIG. 6 is a waveform of an error signal or Focus OK (FOK) signal.

Referring to FIG. 1 and FIG. 4A to FIG. 6, as in the exemplary embodiment described above with reference to FIG. 3, the record unit 130 starts recording from a 90° position of the track, and an initial recording position corresponding to the 90° position of the track is stored in the memory 150 (step S510). An error signal Er_s, which is an output signal of the error detecting unit 160, has a second logic state from a time t1 (which starts recording from the 90° position of the track).

Since a recording error occurs at the 220° position of the track, the logic state of the error signal Er_s changes into a first logic state from a time t2. Additionally, since the error signal Er_s has the first logic state from the time t2 (Yes, step S520), the controller 140 controls the record unit 130 to stop the recording from the time t2, and a stopped position corresponding to the 220° position of the track is stored in the memory 150 (step S530). In this case, as in the case of FIG. 3, the controller 140 can delete the data recorded up to this point from data stored in the buffer memory 120.

When an error is corrected at a time t3, the logic state of the error signal Er_s changes into the second logic state from the time t3. Accordingly, since the time t3, the controller 140 controls the record unit 130 to record the data (which is the data of the position marked at 220° of the buffer memory 120) of the buffer memory 120 corresponding to the stopped position from the stopped position (which is the 220° position of the track) (step S540).

In step S520, while the recording is being normally performed, it is determined whether the logic state of the error signal Er_s changes into the first logic state. Whenever a recording error occurs and the logic state of the error signal Er_s changes into the first logic state (yes, Step S520), the steps of S530 and S540 are repeatedly performed.

In step S550, in the case where an error does not occur in the recording (No, Step S520) and all the data of the buffer memory 120 is recorded in the track (Yes, S550), the record unit 130 ends the recording of the track and prepares to record a next track. For example, when the record unit 130 again starts recording from the 220° position of the track, in the case where it is intended to normally perform all recording for the track and to record data at the 90° position (e.g., time t4) of the track again, the record unit 130 ends the recording of the track and prepares to record a next track.

Even in the case of using FOK signal as in FIG. 2, in order to determine whether an error occurs in the recording, the recording of the optical disc device 200 can be controlled according to the logic state of the FOK signal of FIG. 6 like in the embodiment of FIG. 5.

Accordingly, recording of an optical disc device can be successfully performed on a labeled surface of an optical disc even when a recording error occurs in recording, thereby increasing the recording quality.

While the present general inventive concept has been particularly shown and described with reference to exemplary embodiments thereof, it will be understood by those of ordinary skill in the art that various changes in form and details may be made therein without departing from the spirit and scope of the present general inventive concept.

What is claimed is:

1. An optical disc device for recording data on a labeled surface of an optical disc, the optical disc device comprising:
    a buffer memory storing data;
    a record unit using data stored in the buffer memory to record to the labeled surface of the optical disc; and
    a controller controlling the record unit such that when a recording error occurs, the recording is stopped and when the error is corrected, the recording of data is resumed from a position of the optical disc where recording is stopped (a stopped position),
    wherein the controller deletes already recorded data from the buffer memory when the recording error occurs during the recording.

2. The optical disc device of claim 1, further comprising a memory storing an initial recording position where the record unit starts an initial recording, and storing the stopped position where the recording is stopped.

3. The optical disc device of claim 2, wherein the controller controls the record unit using the initial recording position and the stopped position stored in the memory.

4. The optical disc device of claim 2, wherein the controller controls the record unit to stop the recording when a recording error is caused by the recording not being performed on the optical disc, the optical disc device undergoing an impact or vibration, or a recording voltage being unstable.

5. The optical disc device of claim 1, further comprising an error detecting unit outputting an error signal having a logic state indicating whether the recording has an error.

6. The optical disc device of claim 5, wherein the error detecting unit outputs an error signal of a first logic state when the recording has an error, and an error signal of a second logic state when the recording has no error.

7. The optical disc device of claim 6, wherein the controller controls the record unit such that when the error signal has the first logic state, the recording is stopped, and when the logic state of the error signal changes from the first logic state to the second logic state, the data is recorded from the stopped position.

8. An optical disc device for recording on a labeled surface of an optical disc, comprising:
    a buffer memory storing data;
    a record unit using data stored in the buffer memory to record to the labeled surface of the optical disc; and
    a controller controlling the record unit such that when a Focus OK (FOK) signal has a first logic state, the recording is stopped, and when the logic state of the FOK signal changes from the first logic state to a second logic state, the data is recorded from a location of the optical disc where recording is stopped (a stopped position), wherein the FOK signal has the first logic state when the recording has an error and has the second logic state when the recording has no error,
    wherein the controller deletes already recorded data from the buffer memory when the logic state of the FOK changes from the second logic state to the first logic state.

9. The optical disc device of claim 8, further comprising a memory storing an initial recording position where the record unit starts an initial recording, and storing the stopped position where the recording is stopped.

10. The optical disc device of claim 8, wherein the FOK signal has the first logical state when a recording error is caused by the recording not being performed on the optical disc, the optical disc device undergoing an impact or vibration, a spindle motor being stopped, or a recording voltage being unstable.

11. A method of controlling recording of an optical disc device performing recording on a labeled surface of an optical disc, the method comprising:
    stopping the recording when a recording error occurs;
    resuming recording data from a position of the optical disc where recording is stopped (stopped position) after the recording error is corrected; and
    deleting data already recorded from the buffer memory when the recording error occurs during the recording.

12. The method of claim 11, further comprising storing an initial recording position indicating a position of the optical disc where an initial recording starts, and the stopped position where the recording is stopped.

13. The method of claim 11, wherein the recording error is caused by the recording not being performed on the optical disc, the optical disc device undergoing an impact or vibration, a stopping of a spindle motor, or an unstable recording voltage.

14. A method of controlling recording of an optical disc device performing recording on a labeled surface of an optical disc, the method comprising:
    stopping the recording when an error signal has a first logic state;
    recording data from a position of the optical disc where recording is stopped (stopped position) of the recording when the logic state of the error signal changes from the first logic state to a second logic state, wherein the error signal has the first logic state when the recording has an error and the second state when the recording has no error; and
    deleting already recorded data from the buffer memory when the logic state of the error signal changes from the second logic state to the first logic state.

15. The method of claim 14, further comprising storing an initial recording position indicating a position of the optical disc where an initial recording starts, and the stopped position where the recording is stopped.

16. The method of claim 14, wherein the error signal is a Focus OK (FOK) signal.

* * * * *